UNITED STATES PATENT OFFICE.

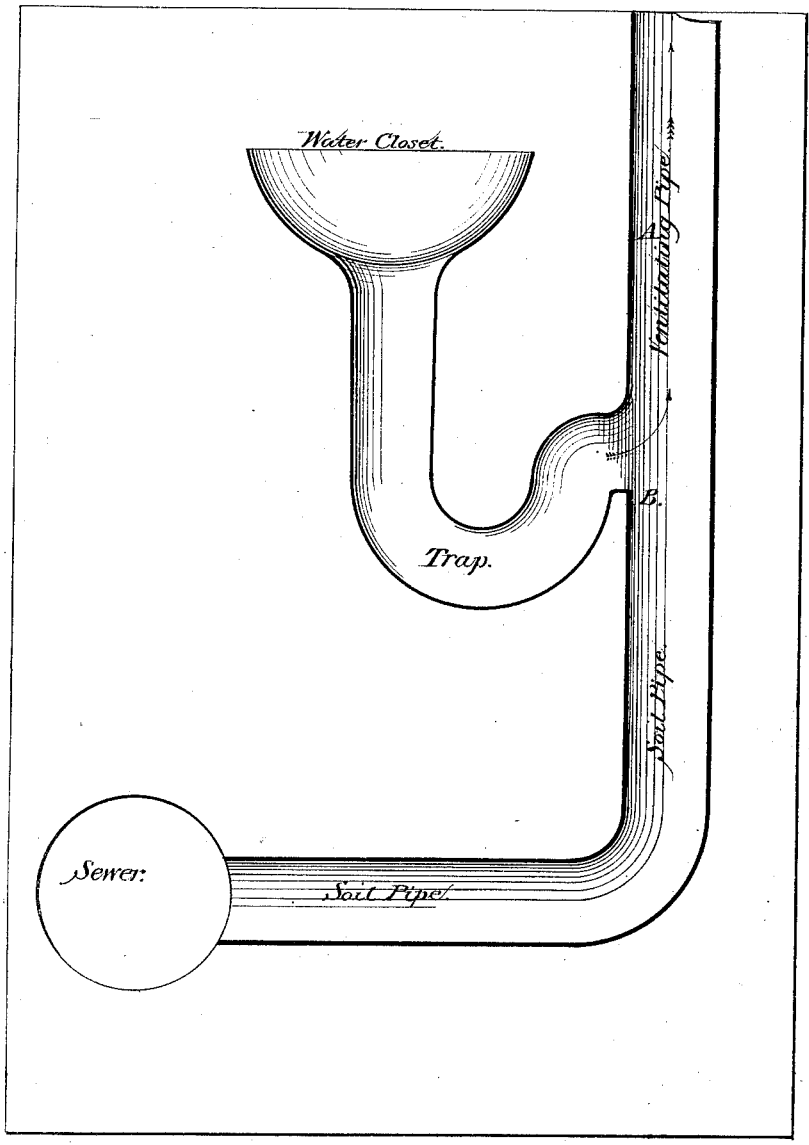

WALTER G. MACKAY, OF NEW YORK, N. Y.

VENTILATING SINKS, WATER-CLOSETS, &c.

Specification of Letters Patent No. 26,773, dated January 10, 1860.

*To all whom it may concern:*

Be it known that I, WALTER G. MACKAY, of the city, county, and State of New York, have invented an Improvement in the Mode of Ventilating Sinks, Water-Closets, &c.; and I do hereby declare that the following is a full and exact description thereof.

To enable others to make and use my invention, I proceed to describe its construction and operation, reference being had to the drawing, hereunto annexed and making part of this specification.

Figure 1—and only figure—is a section of the pipes, showing the junction of the ventilating pipe with the soil pipe.

My plan of ventilating water closets is seen in the drawing where the perpendicular soil-pipe, B, is continued up in the pipe, A, above the trap, which is beneath the basin. The ventilating pipe A, may be extended out at the top of the house—or reach into a flue built in the wall. The object of it is to carry off the effluvia that arises from the sewer and the interior of the soil-pipe, and which, except for such ventilating pipe, would occasionally pass the trap and enter into the room.

The ventilating pipe is applied at the place, (the upper bend) where it is needed, and will effectually prevent offensive odors coming through the trap. It may be applied to all sinks and cess-pools in like manner, and will be found equally effectual. I believe that no pipe for the purpose has ever before been applied at the upper bend of the trap.

What I claim as my invention and desire to secure by Letters Patent is—

The application of the ventilating pipe A, at the upper bend of a bent pipe trap, and at its junction with the soil-pipe B, in combination with said trap and soil-pipe, in the manner and for the purposes herein specified.

WALTER G. MACKAY.

Witnesses:
  OBEEN G. WARREN,
  MARY G. WARREN.